May 7, 1935.                L. L. COLLINS                2,000,691
                      COMPRESSOR DISCHARGE VALVE
              Filed April 2, 1931          2 Sheets-Sheet 1
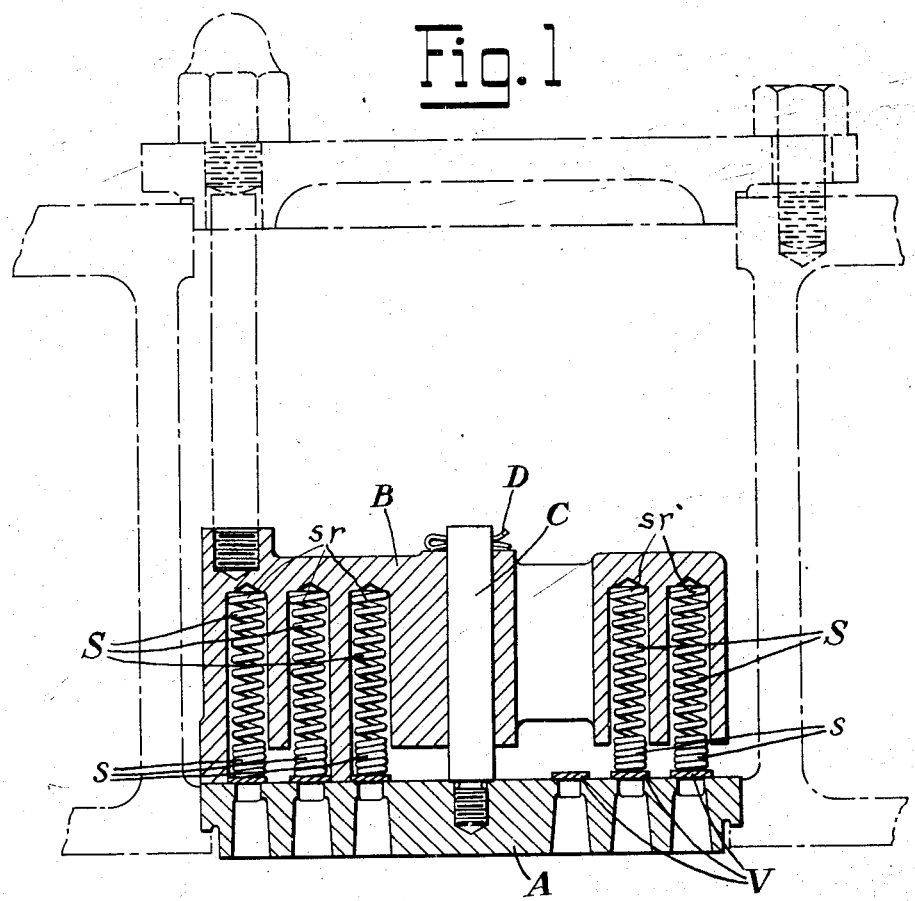
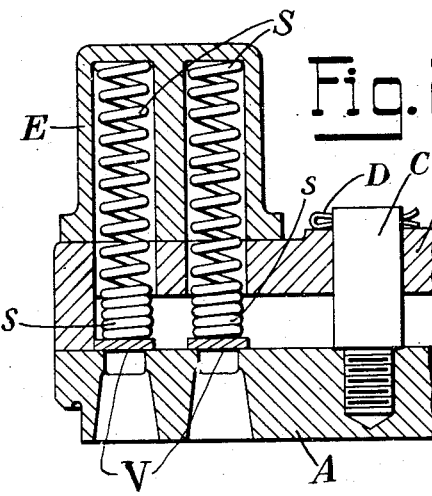
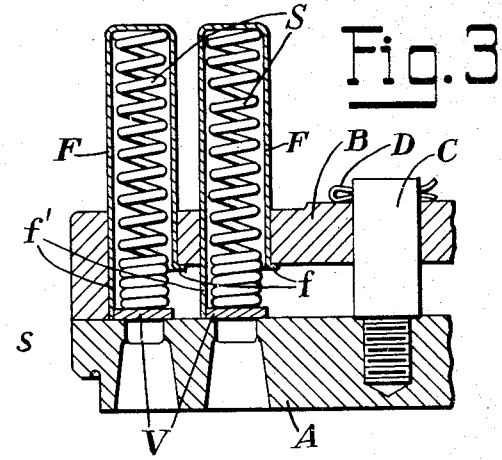
INVENTOR.
Lester L. Collins
BY
Ira L. Nickerson
ATTORNEY.

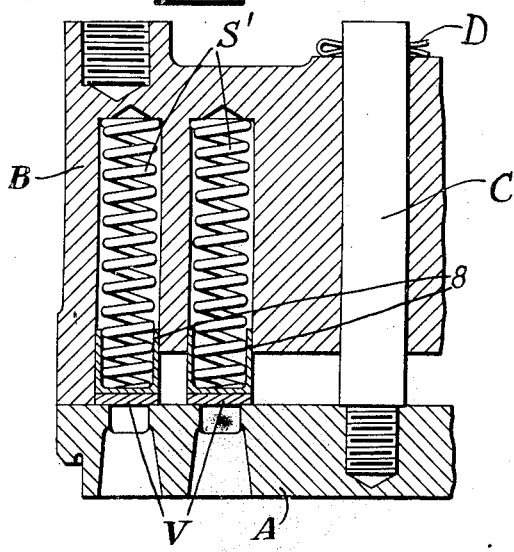
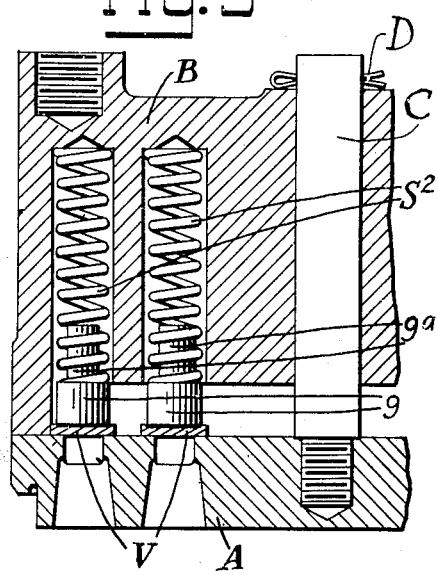
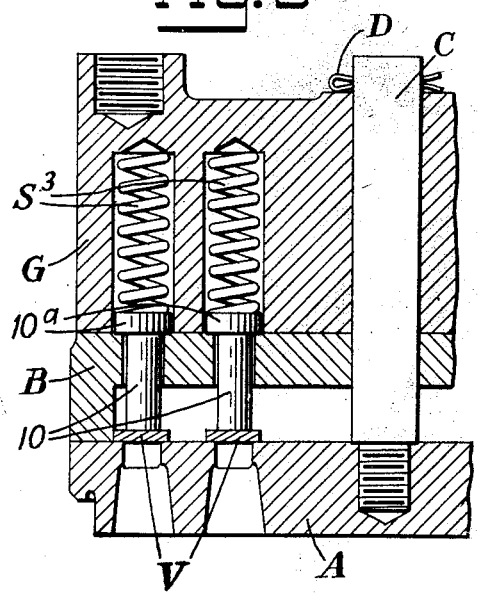
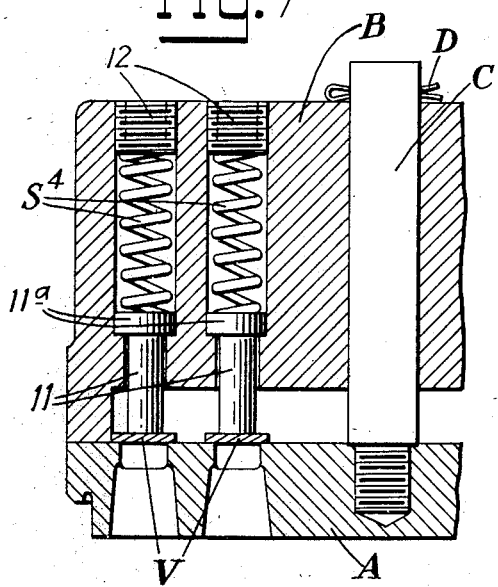

Patented May 7, 1935

2,000,691

UNITED STATES PATENT OFFICE 2,000,691

COMPRESSOR DISCHARGE VALVE

Lester L. Collins, Franklin, Pa., assignor to Chicago Pneumatic Tool Company, New York, N. Y., a corporation of New Jersey Application April 2, 1931, Serial No. 527,218

4 Claims. (Cl. 277—60)

This invention relates to valves and more particularly to valves of the disk or plate type for controlling the discharge of air and gas compressors.

As is well known most valves of the disk or plate type utilize a series of relatively small springs for yieldingly restoring and maintaining the valve plates on their seats. When such valves are used to control the discharge of high speed compressors, difficulties are encountered due to the inability of the springs to retain their tension when subjected to the high heat of the discharged gases.

One object of the invention is to provide an improved design of discharge valve for high speed compressors. Another object is to secure normal operation of the valve under conditions of extreme heat. Another object is to eliminate the collapsing or "setting" of springs in valves of the described type. Still other objects will be apparent from the detailed description which follows.

The invention involves suitable means or structure for rendering the operating springs for the valve members or plates immune from injury and loss of tension from the heat of the discharged gases passed thereby. The exposed portions of the springs may be wound into a tight coil if enough of the spring can be housed in the keeper portion of the valve assembly to provide the required spring action. Another arrangement is to enclose the exposed portion of the spring in a protecting sleeve or cup. Still other forms involve the use of a plug or solid extension for the spring for direct contact with the valve member. Various housing arrangements for the springs are available.

In order to illustrate the invention, concrete embodiments thereof are shown in the accompanying drawings, in which:

Fig. 1 is a vertical sectional view through a valve assembly and indicates in broken outline the manner of mounting the same in a compressor cylinder; and Figs. 2 to 7 inclusive are fragmentary vertical sectional views on an enlarged scale of valve assemblies illustrating modifications of the invention.

In the embodiments of the invention chosen for the purpose of illustration, various forms of valve assemblies suitable for controlling the high speed discharge of air and gas compressors are shown, the forms differing from one another in relatively minor respects as will presently appear. In general and with special reference to Fig. 1, the valve assembly comprises a seat member A having openings therethrough for the passage of the compressed medium and one or more valves V of the plate or disk type covering such openings. Valves V are yieldingly maintained upon their seats by a series of springs S projecting from bores in a keeper B secured to seat member A over valves V in any suitable or desired manner as by a post or stud C on seat member A extending through a central bore in keeper B, the parts being maintained in assembled relation by a retainer member such as a cotter pin D. The valve assembly is disclosed in Fig. 1 in normal operative position in a compressor cylinder, the latter and associated parts being indicated in broken outline.

In order to maintain the operation of the valve at normal efficiency, springs S must be protected from loss of tension or from taking a permanent "set" by reason of the heat of the discharge. Study and experimentation indicates that spring failure develops in most cases in that part of the spring having the greatest exposure to the heat of the discharge, namely the portion in the space between keeper B and seat member A. The invention accordingly gives particular attention to protection for the spring at this point and the protecting means may form a part of the spring, as an integral part thereof, or involve an independent member of some character.

In the forms of the invention shown in Figs. 1, 2, and 3, spring S is of novel construction. The lower portion $s$ in direct contact with valve V is tightly wound to act as a plunger and this tightly wound portion spans the space between keeper B and seat member A. The remaining portion of the valve is of usual form with the coil loosely wound for resiliency. Thus resiliency is not a function of the part exposed to the heat of discharge and the resilient portion is suitably housed within the keeper B itself, or in a special housing, with the result that its temperature is kept fairly constant due to dispersion of the heat by conduction and convection to the surrounding metal of the keeper or housing member. The upper coil or coils of springs S may be enlarged or expanded as indicated at $sr$ in Fig. 1 so as frictionally to engage the walls of the keeper or housing member and remain in place during assembly or disassembly.

In Fig. 1 the resilient portions of spring S are entirely housed in the thick wall of keeper B. In Fig. 2 keeper B is a relatively thin plate with bores for spring S extending entirely therethrough. The resilient portions of spring S which extend beyond and above keeper B are enclosed in a heavy housing E which may be secured to keeper B in any suitable manner as by screws or bolts (not shown). Keeper B in Fig. 3 is similar to the keeper of Fig. 2 but springs S are individually enclosed in housings F mounted in the spring bores in keeper B. Housings F, as shown, are of thin or sheet material with closed upper ends to serve as abutments for springs S and the lower portions have an outwardly turned retainer flange $f$ engaging the lower face of keeper B. In addition housings F may have axial extensions $f'$ terminating adjacent seat member A and serving as guide and positioning means for valves V.

In Fig. 4 seat member A and keeper member B are the same as in Fig. 1 but springs S' are of the usual form being loosely coiled throughout their length. The lower portions of the spring which would normally be exposed to the discharge gases are enclosed in hollow or cup shaped members or plungers 8 which directly engage plate valves V.

In Fig. 5 springs $S^2$ are of normal form but are much shorter than springs S' shown in Fig. 4, so as to be confined wholly within the bores of keeper B. The thrust of springs S is transmitted to valves V by interposed solid plungers 9 having reduced extensions $9a$ telescopingly engaged by the lower coils of spring $S^2$.

In Fig. 6 the keeper unit comprises separate parts, namely a relatively thin keeper B with bores in line with valves V and a housing member G secured to each other in any suitable or desired manner. Post or stud C of seat member A may extend through both as indicated on the drawings. The bores in housing G which receive springs $S^3$ are of greater diameter than the aligned bores in keeper B. Plungers 10 are interposed between springs $S^3$ and valves V and having heads $10a$ slidably received in the bores of housing G and reduced stems projecting through the bores in keeper B to contact with valves V. Heads $10a$ serve as limiting stops for plungers 10 so that when the keeper unit is assembled neither plungers 10 nor springs $S^3$ can be ejected or drop out of the unit.

Fig. 7 shows a construction in which a separate housing member is not required. Keeper B is of substantial thickness and the bores for the resilient means for valves V extend entirely therethrough. The bores are reduced at their lower ends to receive stem portions of plungers 11 while enlarged heads $11a$ are slidably received in the large ends of the bores. Springs $S^4$ are disposed above heads $11a$ and the outer ends of the bores are closed by plugs 12.

From the above it will be apparent that the invention is capable of expression in numerous forms or variations, that in each of the forms shown adequate provision is made for the protection of the springs from damage by heat, that the resilient portion of the spring is properly housed and that the effect of a solid plunger is secured in the zone of greater heat, namely in the space between the keeper and the seat member of the valve assembly.

While the invention has been herein disclosed in what are now considered to be preferred forms, it is to be understood that the invention is not confined to the specific details thereof but covers all changes, modifications, and adaptations within the scope of the appended claims.

I claim as my invention:

1. A valve assembly comprising a seat member, a plate or disk valve on said member, a keeper secured to said member over said valve and having a series of bores therethrough, springs extending through said bores for yieldingly maintaining said valve in contact with said member, and housing means for said springs mounted in said bores, said valve being movable relatively to said housing means.

2. A valve assembly comprising a seat member, a plate or disk valve on said member, a keeper secured to said member over said valve and having a series of bores therethrough, springs extending through said bores for yieldingly maintaining said valve in contact with said member, and housing members of sheet material in said bores over said springs and having laterally projecting portions engaging the lower face of said keeper.

3. A valve assembly comprising a seat member, a plate or disk valve on said member, a keeper secured to said member over said valve and having a series of bores therethrough, springs extending through said bores for yieldingly maintaining said valve in contact with said member, housing members of sheet material in said bores over said springs and having laterally projecting portions engaging the lower face of said keeper, and axially extending portions terminating adjacent said seat member for guiding and positioning said valve.

4. A valve assembly for a compressor comprising a seat member having an opening therethrough for the passage of the compressed medium, a plate or disc valve engageable with the seat member and adapted to cover the opening for controlling the flow of compressed medium therethrough, a keeper member secured to the seat member above said valve, a housing carried by the keeper member, and means for yieldingly maintaining said valve in contact with the seat member, said means comprising a one-piece coiled wire having a resilient portion inside said housing and a tightly wound non-resilient portion completely spanning the space between the seat and keeper members, said tightly wound portion having a closed circumferential surface and thereby being unaffected by the heat received by it from the compressed medium.

LESTER L. COLLINS.